US011173835B2

(12) United States Patent
Dow et al.

(10) Patent No.: US 11,173,835 B2
(45) Date of Patent: Nov. 16, 2021

(54) NOTIFYING PASSENGERS OF IMMINENT VEHICLE BRAKING

(71) Applicant: INTERNATIONAL BUSINESS MACHINES CORPORATION, Armonk, NY (US)

(72) Inventors: Eli Michael Dow, Wappingers Falls, NY (US); Campbell D Watson, Brooklyn, NY (US); Marco Aurelio Stelmar Netto, São Paulo (BR)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 16/458,249

(22) Filed: Jul. 1, 2019

(65) Prior Publication Data
US 2021/0001771 A1    Jan. 7, 2021

(51) Int. Cl.
| B60Q 9/00  | (2006.01) |
| B60T 7/12  | (2006.01) |
| H04W 4/06  | (2009.01) |
| B60T 8/172 | (2006.01) |
| B60T 8/174 | (2006.01) |

(52) U.S. Cl.
CPC ............ B60Q 9/00 (2013.01); B60T 7/12 (2013.01); B60T 8/172 (2013.01); B60T 8/174 (2013.01); H04W 4/06 (2013.01)

(58) Field of Classification Search
CPC ... B60Q 9/00; B60T 7/12; B60T 8/172; B60T 8/174; H04W 4/06
USPC .......................................................... 701/70
See application file for complete search history.

(56) References Cited

U.S. PATENT DOCUMENTS

| 3,820,855   | A  | * | 6/1974  | Salotti et al. ....... B60T 8/17613 |
|             |    |   |         |                            303/158 |
| 9,292,635   | B2 |   | 3/2016  | Kozloski                            |
| 9,809,159   | B1 |   | 11/2017 | Snyder                              |
| 9,963,127   | B2 | * | 5/2018  | Pilutti ...................... B60T 7/22 |
| 2014/0306817| A1 |   | 10/2014 | Ricci                               |

(Continued)

FOREIGN PATENT DOCUMENTS

| CN | 109421687 A    | 3/2019 |
| JP | 2004203387 A5  | 7/2004 |

(Continued)

OTHER PUBLICATIONS

Mell et al., "The NIST Definition of Cloud Computing", National Institute of Standards and Technology, Special Publication 800-145, Sep. 2011, pp. 1-7.

*Primary Examiner* — Gertrude Arthur Jeanglaude
(74) *Attorney, Agent, or Firm* — John Noh

(57) ABSTRACT

A method, a computer program product, and a computer system notify passengers of an imminent brake event of a vehicle. The method includes determining that the imminent brake event is about to occur. The method includes determining a delay value to be applied to a brake system of the vehicle. The method includes determining a safety threshold associated with the imminent brake event based on at least one of conditions of the vehicle and surroundings of the vehicle. As a result of the delay value being less than the safety threshold, the method includes postponing use of the brake system for a duration corresponding to the delay value. The method includes broadcasting a notification to the passengers of the imminent brake event.

20 Claims, 6 Drawing Sheets

(56) References Cited

U.S. PATENT DOCUMENTS

2014/0368324 A1   12/2014   Seifert
2015/0116133 A1    4/2015   Mawbey
2019/0016258 A1    1/2019   Snyder

FOREIGN PATENT DOCUMENTS

| JP | 2017030390 A5 | 8/2018 |
| WO | 2007023668 A1 | 3/2007 |
| WO | 2016163662 A1 | 10/2016 |
| WO | 2018236736 W | 12/2018 |
| WO | 2019067501 A1 | 4/2019 |

* cited by examiner

NOTIFYING PASSENGERS OF IMMINENT VEHICLE BRAKING

BACKGROUND

The exemplary embodiments relate generally to vehicle braking, and more particularly to notifying passengers when a vehicle is imminently braking.

There are various forms of transportation in which passengers may ride. In a vehicle designed for public transportation, the passengers may be seated or standing. The vehicle may be equipped with safety devices such as seat belts for passengers who are seated or handles and poles for passengers who are standing. Although provided for the passengers' use, the passengers may choose to not use the seat belts, not hold the handles, or be situated in a precarious position within the vehicle. When the vehicle gradually brakes, the passengers may be generally unaffected, even those passengers not using the safety devices. However, when the vehicle makes a sudden stop, even for those passengers using the safety devices, the passengers in the public transportation vehicle may inadvertently move from resultant momentum that results in falling or colliding with other passengers or fixed, hard internal components of the vehicle (e.g., seats, poles, etc.). For passengers who are unprepared for the sudden stop, the sudden stop may cause injury.

SUMMARY

The exemplary embodiments disclose a method, a computer program product, and a computer system for notifying passengers of an imminent brake event of a vehicle. The method comprises determining that the imminent brake event is about to occur. The method comprises determining a delay value to be applied to a brake system of the vehicle. The method comprises determining a safety threshold associated with the imminent brake event based on at least one of conditions of the vehicle and surroundings of the vehicle. As a result of the delay value being less than the safety threshold, the method comprises postponing use of the brake system for a duration corresponding to the delay value. The method comprises broadcasting a notification to the passengers of the imminent brake event.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
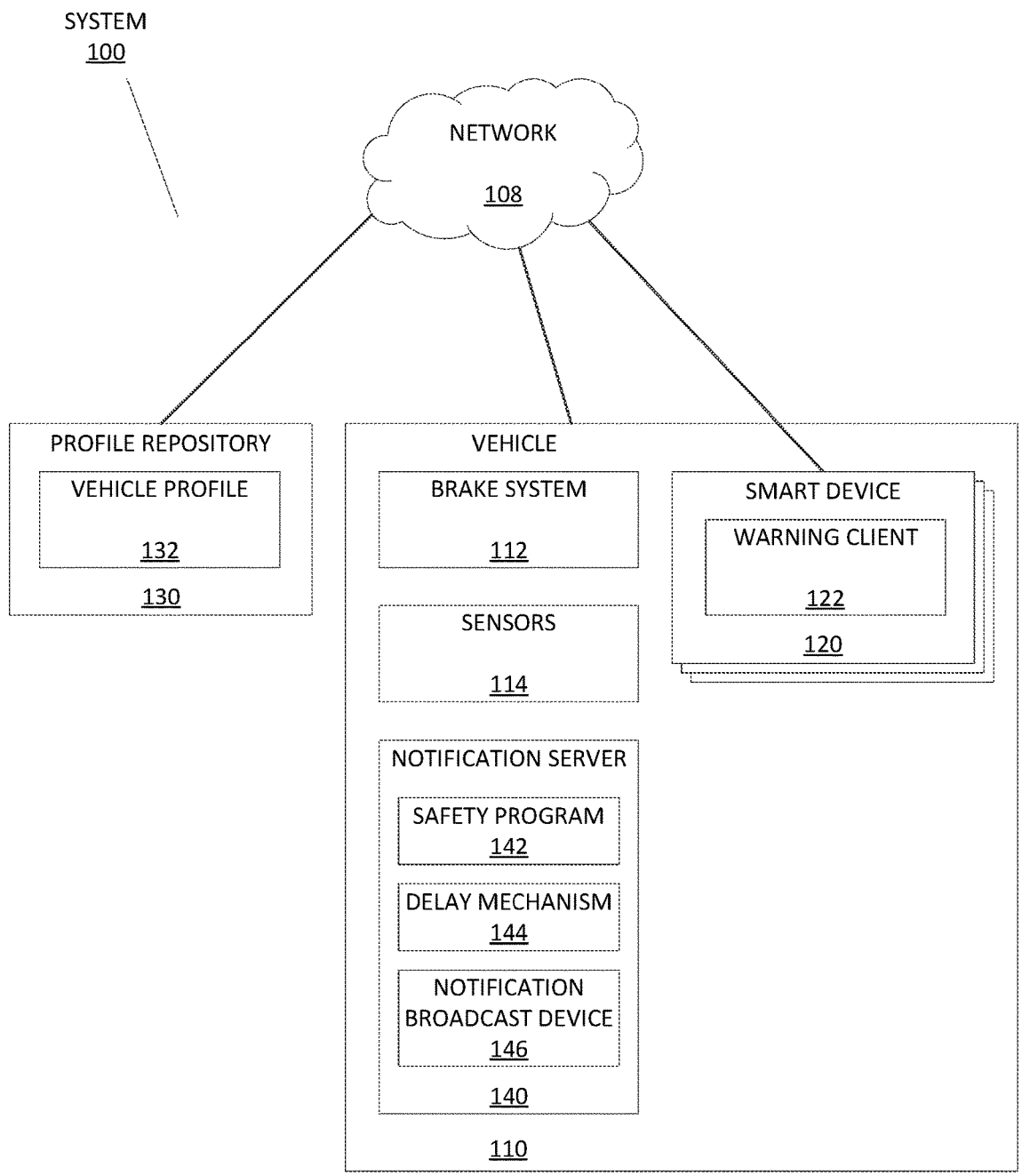
FIG. 1 depicts an exemplary schematic diagram of a safety notification system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for determining when an imminent or sudden brake event of a vehicle is likely to occur and notifying passengers inside the vehicle about the vehicle suddenly stopping or decelerating at an unexpectedly increased rate. As will be described in greater detail below, the exemplary embodiments are configured to determine a delay value that may be applied to a brake system of the vehicle, when allowable, so that a notification broadcast to the passengers creates a window of time for the passengers to prepare for the vehicle suddenly stopping or decelerating in an imminent brake event. The exemplary embodiments may utilize sensor based data to determine conditions of the vehicle that may be indicative of when the vehicle is likely to suddenly brake leading to the imminent brake event and broadcast a corresponding notification to personal devices of the passengers. Key benefits of the exemplary embodiments may include warning the passengers of an imminent brake event that allows the passengers to make preparations to prevent injuries as a result of the vehicle suddenly stopping. Detailed implementation of the exemplary embodiments follows.

Conventional approaches to addressing a dangerous driving condition, preventing collisions, protecting individuals inside a vehicle, etc. involve modifying the vehicle to prevent the vehicle from suddenly stopping or alerting the driver of the vehicle. For example, in a first conventional approach, a mechanism may be incorporated in the vehicle that prevents an unintended acceleration of the vehicle or control a braking in the vehicle based on an optimal brake pattern. In another example, in a second conventional approach, an alert system may be incorporated in the vehicle for various events and conditions on the roads to provide information to the driver. In a further example, in a third conventional approach specific to rear end collision prevention, an alert system may be incorporated in the vehicle to notify a driver and refocus the driver's attention when a rear end scenario is detected. In yet another example, in a fourth conventional approach, a deployment may collaboratively plan for vehicle crashes to mitigate damage and injuries. However, each of these conventional approaches does not provide any notification to passengers in the vehicle, particularly for an imminent brake event that may cause passengers to collide into objects or people that result in injury.

The exemplary embodiments are configured to notify passengers riding in a vehicle before the vehicle is about to suddenly stop or drastically reduce speed in an imminent brake event. The exemplary embodiments do not prevent the vehicle from braking quickly toward a sudden stop. In allowing the sudden stop to occur, the exemplary embodiments are configured to broadcast a notification to the passengers and create a window in which passengers may make preparations for the imminent brake event. Through incorporation of a micro-delay on a brake system of the vehicle, the exemplary embodiments may create the window of time in which the passengers may prepare. The exemplary embodiments may broadcast the notification to the passengers via respective devices using any sensory feedback that uniquely indicates to the passengers of the imminent brake event.

The exemplary embodiments are described with regard to a vehicle performing a sudden stop and broadcasting a notification to passengers riding in the vehicle. However, the exemplary embodiments being directed to the vehicle performing the sudden stop is only illustrative. The exemplary embodiments may be utilized in any scenario involving a vehicle and a sudden movement that may cause injury to passengers riding in the vehicle who are unprepared for the sudden movement. For example, the exemplary embodiments may be utilized or modified for vehicles that are decelerating above a predetermined threshold but not necessarily stopping using any deceleration mechanism. In another example, the exemplary embodiments may be utilized or modified for vehicles that are accelerating above a predetermined threshold. The exemplary embodiment being directed to a vehicle scenario is also only illustrative. The exemplary embodiments may be implemented or modified to be used in non-vehicle scenarios that prepare users of a situation that is about to occur, particularly if a prospect for injury from the situation is present.

The exemplary embodiments are further described with regard to imminent brake events in which a vehicle performs sudden stops or drastic decelerations. However, the imminent brake event is only illustrative. The exemplary embodiments may be utilized or modified for any brake event in which the vehicle performs stops or decelerations. Although the exemplary embodiments may be used each time the vehicle brakes or decelerates, the passengers may become disenchanted or annoyed such that the passengers begin to ignore notifications, particularly when the notifications are repeatedly unwarranted (e.g., a very gradual deceleration). Thus, the exemplary embodiments are described for identified imminent brake events (e.g., using machine learning) that justify the use of the notifications.

The exemplary embodiments are described from the perspective of passengers in a vehicle or individuals who are not driving or controlling the vehicle. As passengers may generally be unaware of when imminent brake events occur, the exemplary embodiments are directed toward alerting the passengers. In contrast, the individual controlling the movement of the vehicle may be more aware of when the imminent brake events occur, such as based on an input being provided by the controlling individual. However, the exemplary embodiments may also be utilized for any individual who is riding the vehicle including the driver, conductor, etc. For example, when the driving or controls are automated or when actions of the vehicle are performed in an automated manner, the vehicle may determine when the imminent brake event occurs without any user intervention, therefore being unknown to the driver, conductor, etc. Accordingly, the exemplary embodiments being described with respect to passengers is only illustrative and may be used with any individual riding in the vehicle.

FIG. 1 depicts a safety notification system 100, in accordance with the exemplary embodiments. According to the exemplary embodiments, the safety notification system 100 may include a vehicle 110, one or more smart devices 120, one or more profile repositories 130, and a notification server 140, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the safety notification system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the safety notification system 100 that do not utilize the network 108. In a particular embodiment, the safety notification system 100 may utilize wired connection pathways between the vehicle 110, the profile repository 130, and the notification server 140 and utilize wireless connection pathways between the notification server 140 and the smart devices 120.

In an illustrative example of the network 108 arranged in the safety notification system 100, the network 108 may have an operating area that includes at least an interior of the vehicle 110. For example, the network 108 may include at least one of a LAN, a wireless LAN (WLAN), a Bluetooth based network (e.g., piconet), etc. The notification server 140 may be part of a LAN arranged for the vehicle 110 while smart devices 120 on the person of passengers entering the vehicle 110 may associate with a WLAN where the LAN and the WLAN are part of an overall network 108 of the vehicle 110. One or more access points of the network 108 of the vehicle 110 may be positioned so that the operating area of the network 108 covers an entirety of the interior space of the vehicle 110 or covers areas of the interior space of the vehicle 110 where passengers and their respective smart devices 120 may be located. It is again noted that this arrangement for the network 108 is only for illustrative purposes. In another exemplary embodiment, when the network 108 is configured to exchange data at a rate that is acceptable for purposes of the exemplary embodiments, the network 108 of the safety notification system 100 may be arranged as a WAN utilizing various communication protocols (e.g., cellular, WiFi, etc.) and remote components separately located from one another.

In the exemplary embodiments, the vehicle 110 may represent any transport in which one or more passengers may ride. For example, the vehicle 110 may be an automobile, a car, a bus, a boat, a trolley, a train, a subway, etc. Depending on the type, the vehicle 110 may include different areas (e.g., a driver's seat, an aisle, passenger seats, a standing zone, etc.), may include a plurality of sections (e.g., a plurality of train cars linked together), etc. For illustrative purposes according to the exemplary embodiments, the vehicle 110 may include a standing zone or areas in which passengers may stand such as on a bus or subway. Among the various components of the vehicle 110 based on the type of vehicle, for purposes of the exemplary embodiments, the vehicle 110 may include a brake system 112 and sensors 114.

The brake system 112 may represent any mechanism by which the vehicle 110 may decelerate. For example, the brake system 112 may include mechanical components utilizing a friction based mechanism to slow the vehicle 110. In another example, the brake system 112 may include electric and/or magnetic components utilizing a magnetically driven mechanism to slow the vehicle 110. A driver of the vehicle 110 may provide an input that controls the brake system 112 to accelerate and decelerate the vehicle. For example, on an automobile or bus, the driver may depress a brake pedal that triggers the brake system 112 to decelerate the vehicle. In another example, on a subway, the conductor may utilize an electronic board including switches and controls to instruct the vehicle 110 to activate the brake system 112 and decelerate the vehicle 110.

The sensors 114 may generate data indicative of movement of the vehicle 110, surrounding conditions of the vehicle 110, etc. For example, the sensors 114 may include imagers and/or ultrasound sensors (e.g., transmitters and receivers). The imagers may generate image data of a surrounding around the vehicle 110. The ultrasound sensors may generate ultrasound data to detect distances to objects around the vehicle 110. The image data and/or the ultrasound data may also be used to detect changes in position over time of objects surrounding the vehicle 110 (e.g., based on changes from first data at a first time to second data at a second, subsequent time). In another example, the sensors 114 may include a thermometer, a barometer, a precipitation gauge, etc. that generate environmental data regarding a location of the vehicle 110. The environmental data may indicate the temperature, a type of precipitation, an amount of precipitation that is falling or has accumulated, etc. Based on the environmental data, the exemplary embodiments may determine driving conditions. In a further example, the sensors 114 may include a scale that generates weight data indicating a total weight of the vehicle 110 including all individuals who are riding inside the vehicle 110. In yet another example, the sensors 114 may include traditional sensors of a vehicle such as a speedometer generating speed data (e.g., indicating how fast the vehicle 110 is traveling), an odometer generating mileage data (e.g., indicating a number of miles driven), a tire pressure sensor generating pressure data (e.g., indicating a tire pressure when the vehicle 110 has tires), etc. In an additional example, the above noted sensors 114 or further sensors 114 may be Internet of Things (IoT) devices attached to components of the vehicle 110. The sensors 114 may be configured to exchange the respective data being generated with the notification server 140 via the network 108. The sensors 114 may be strategically placed relative to the vehicle 110 to provide access to a respective intended target (e.g., line of sight).

The exemplary embodiments may also utilize information measured by devices of the smart devices 120. Accordingly, the sensors 114 may represent any source from which information associated to movement of the vehicle 110 may be ascertained. For example, the smart devices 120 may include an accelerometer for various purposes (e.g., to track movement in a map application, to track orientation for a compass or level application, etc.). The smart devices 120 may provide this information to the sensors 114 as additional information indicative of how the vehicle 110 is moving. As will be described in detail below, the accelerometer of the smart devices 120 may provide feedback information used in determining brake events, minimizing false positive imminent brake events, determining an effect that a brake event had on a passenger, etc.

In the exemplary embodiments, the smart device 120 may include a warning client 122 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. The smart device 120 may be associated with a respective passenger who is riding the vehicle 110. Thus, the smart device 120 may be located within an interior of the vehicle 110. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 4, as part of a cloud implementation with reference to FIG.

Figure 6:
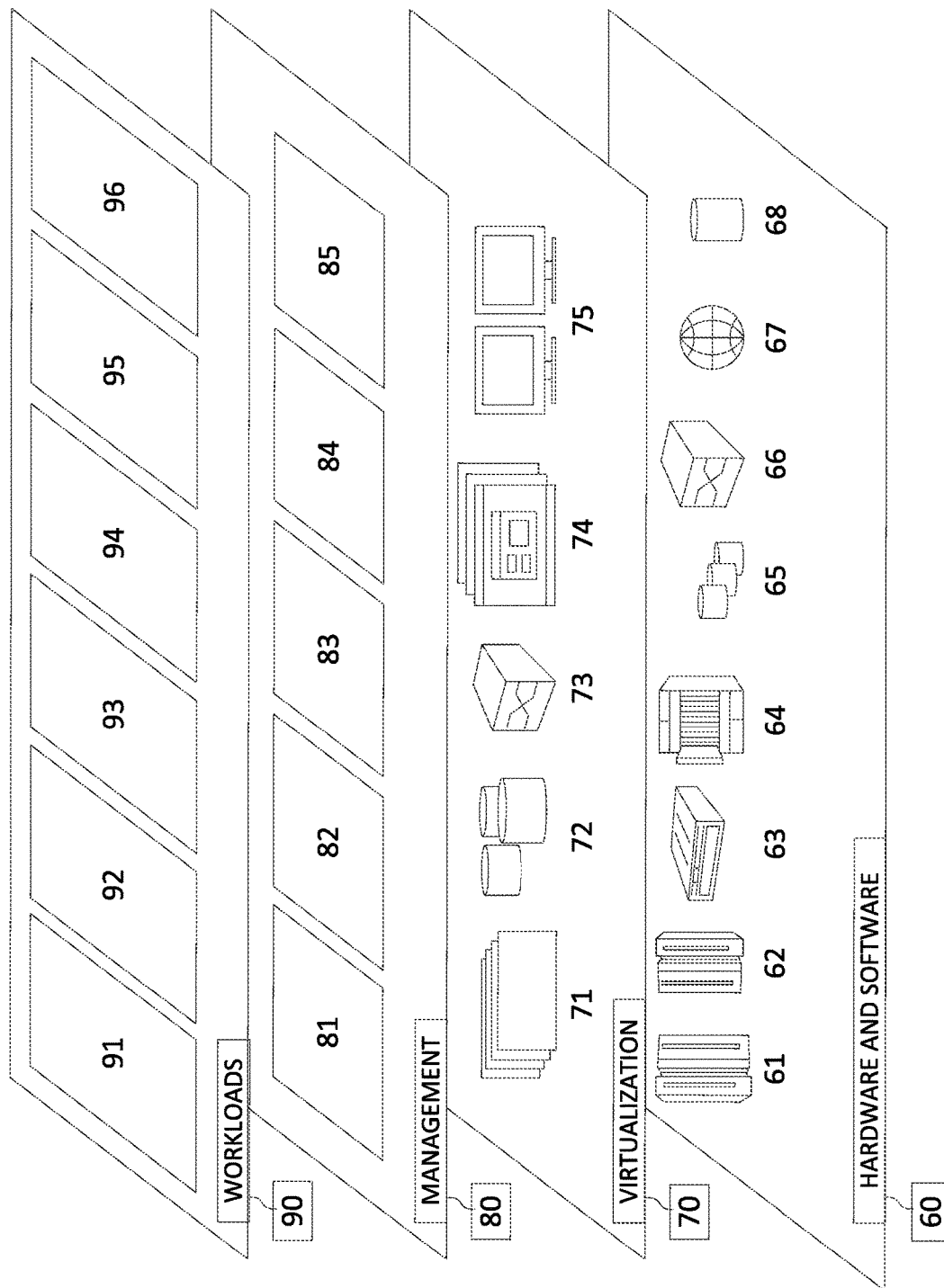
FIG. 6 depicts abstraction model layers, in accordance with the exemplary embodiments.

5, and/or as utilizing functional abstraction layers for processing with reference to FIG. 6.

In the exemplary embodiments, the warning client 122 may act as a client in a client-server relationship and may be a software, hardware, and/or firmware based application capable of generating an alert through an input received via the network 108. In the exemplary embodiments, the warning client 122 may operate as a user interface allowing a user to interact with one or more components of the safety notification system 100, and utilize various wired and/or wireless connection protocols for data transmission and exchange associated with generating an alert for a passenger, including Bluetooth, 2.4 gHz and 5 gHz internet, near-field communication, Z-Wave, Zigbee, etc.

The warning client 122 may be configured to instruct the smart device 120 to generate a feedback output to the passenger indicating that an imminent brake event is about to occur. As will be described in further detail below, the warning client 122 may receive an input from the notification server 140 that has determined that the imminent brake event is about to occur. As a result of receiving this input, the warning client 122 may transmit the instruction to a component of the smart device 120 that generates the feedback output. The smart device 120 may include a sensory component that transforms the feedback output into a corresponding alert to the passenger. For example, the smart device 120 may include an auditory sensory component such as an audio output device that outputs an auditory feedback that uniquely indicates the imminent brake event to the passenger. In another example, the smart device 120 may include a visual sensory component such as a lighting device or a screen that outputs a visual feedback that uniquely indicates the imminent brake event to the passenger. In a further example, the smart device 120 may include a haptic sensory component such as a vibration device that outputs a haptic feedback that unique indicates the imminent brake event to the passenger.

The warning client 122 may allow the passengers to be provided the input from the notification server 140 when the passenger with the smart device 120 rides the vehicle 110. The smart device 120 may have the warning client 122 pre-installed or incorporated into an operating system. Accordingly, the warning client 122 may be configured to automatically perform the operations according to the exemplary embodiments when the passenger enters the vehicle 110 that is equipped with the features of the notification server 140. The passenger may also manually install the warning client 122 to opt into the features associated with the notification server 140. When further options are available, the warning client 122 may be configured with settings that allow when the passenger may utilize the features associated with the notification server 140 (e.g., selecting vehicles, selecting modes of transportation, selecting geographic areas, etc.). In this manner, the warning client 122 may provide a comprehensive experience to the passenger with little to no intervention and/or provide a selectable experience based on inputs provided by the passenger.

The exemplary embodiments are described with respect to alerting passengers through respective ones of the smart devices 120. The characteristics of the passengers riding the vehicle 110 and associated with the smart devices 120 may provide at least a partial basis in which to utilize the features of the exemplary embodiments. As will be described below, the characteristics of the passengers may be considered in how the exemplary embodiments may postpone use of the brake system 112. Further ways to utilize the personal characteristics of the passengers may include dynamically warning the passengers (e.g., elderly passengers may be provided an alert earlier to create a larger window to react). Thus, the warning client 122 may include a passenger profile corresponding to the passenger with whom the smart device 120 is associated. The passenger profile may include various types of information (e.g., demographic information, age information, general health information, etc.).

The safety notification system 100 is described as utilizing the smart devices 120 to provide the feedback to the passengers. However, this arrangement using the smart devices 120 is only illustrative. The exemplary embodiments may be configured to utilize sensory feedback components that may be incorporated in the vehicle 110. For example, the vehicle 110 may include lights, a sound system, etc. that may indicate to the passengers riding thereon about the imminent brake event. Accordingly, the alert that is generated may be provided generally to the passengers.

In the exemplary embodiments, the profile repository 130 may include one or more vehicle profiles 132 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the profile repository 130 is shown as a single device, in other embodiments, the profile repository 130 may be comprised of a cluster or plurality of electronic devices, in a modular manner, etc., working together or working independently. While the profile repository 130 is also shown as a separate component, in other embodiments, the profile repository 130 may be incorporated with one or more of the other components of the safety notification system 100. For example, the profile repository 130 may be incorporated in the notification server 140 or the vehicle 110. Thus, access to the profile repository 130 by the notification server 140 may be performed locally. In another example, the profile repository 130 may be located remotely. Thus, access to the profile repository 130 and to a specific one of the vehicle profiles 132 may be performed through the network 108. The profile repository 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the vehicle profiles 132 may be associated with respective vehicles 110. The vehicle profiles 132 may be populated with information that describes the vehicle 110. For example, the vehicle profile 132 of a given vehicle 110 may indicate a make and model for that vehicle 110. In another example, the vehicle profile 132 may indicate service dates, relative wear of components (e.g., brakes, tires, etc.), travel routes, etc. for the vehicle 110. In a further example, the vehicle profile 132 may include historical information of the vehicle 110 such as imminent brake events that were experienced, the conditions in which the imminent brake event occurred, etc. In yet another example, according to the exemplary embodiments, the vehicle profile 132 may include a delay value specific to the vehicle 110 that may be applied to the brake system 112 when an imminent brake event is about to occur. When no historical information is available to be used in determining the delay value (e.g., a previously determined delay value) or if the exemplary embodiments are configured to be used for each time the vehicle 110 is used, the vehicle profile 132 may indicate a default delay value. For example, the default delay value may be set to 0.

In the exemplary embodiments, the notification server 140 may include a safety program 142 and act as a server in a client-server relationship with the warning client 122 as well as be in a communicative relationship with the profile repository 130. The notification server 140 may also include a delay mechanism 144 and a notification broadcast device 146 in furtherance to utilizing the safety program 142. The notification server 140 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the notification server 140 is shown as a single device, in other embodiments, the notification server 140 may be comprised of a cluster or plurality of computing devices, working together or working independently. The notification server 140 is described in greater detail as a hardware implementation with reference to FIG. 4, as part of a cloud implementation with reference to FIG. 5, and/or as utilizing functional abstraction layers for processing with reference to FIG. 6.

The notification server 140 is shown as being incorporated in the vehicle 110. By utilizing wired or short-range communication pathways, the notification server 140 may perform operations with corresponding inputs and outputs in a timely manner. However, the notification server 140 being incorporated in the vehicle 110 is only illustrative. In another exemplary embodiment, the notification server 140 may be associated with a geographic location (e.g., a city). For example, the notification server 140 may be positioned remotely relative to the vehicle 110 (e.g., in a city administrative building using the network 108 for communications to reach the vehicle 110 while the vehicle 110 is operating within city limits). In such a scenario, the vehicle 110 may be configured with a client (not shown) that operates with the notification server 140. The client may facilitate data exchange between the vehicle 110 and the remote notification server 140 (e.g., enable data from the brake system 112 and/or the sensors 114 to be transmitted to the remote notification server 140 and outputs from the notification server 140 to be received by the vehicle 110).

In the exemplary embodiments, the safety program 142 may be a software, hardware, and/or firmware application configured to determine a delay value to be applied to the brake system 112 when an imminent brake event is about to occur so that passengers are provided a window of opportunity to react to the imminent brake event. In determining the delay value, the safety program 142 may modify a default delay value or previously determined delay value associated with the vehicle 110. The safety program 142 modifying a delay value is only illustrative and the safety program 142 may be configured to determine the delay value in an ad hoc manner for each imminent brake event. The delay value may be a dynamically set value to be used according to the changing conditions of the vehicle 110, particularly a number, a demographic, etc. of the passengers riding the vehicle 110. In dynamically determining the delay value, the safety program 142 may determine a ratio of passengers who received a notification indicating the imminent brake event in a timely manner (e.g., the notification was received to create the window of time for the passenger to sufficiently react) and passengers who did not receive the notification or received the notification indicating the imminent brake event but not in a timely manner (e.g., the resulting window of time to react was insufficient for the passenger). Based on the ratio, the safety program 142 may increase the delay value (e.g., when the ratio is less than a minimum threshold) or decrease the delay value (e.g., when the ratio is greater than a maximum threshold).

The safety program 142 may further be configured to determine when an imminent brake event is about to occur and determine a response to the imminent brake event. The safety program 142 may monitor braking activity of the vehicle 110 and determine when the braking activity qualifies as an imminent brake event based on various criteria (e.g., change in velocity over a period of time is greater than a deceleration threshold). As a result of identifying the imminent brake event, the safety program 142 may determine when the delay value is to be applied to the brake system 112. The safety program 142 may determine whether the delay value may be used according to a safety threshold determined according to the current conditions being experienced by the vehicle 110 that is about to perform the imminent brake event. When the delay value is within the safety threshold, the safety program 142 may delay the brake system 112 for a duration of the delay value to create the window of time to react while broadcasting a notification to the passengers riding the vehicle 110 indicating that the imminent brake event is about to occur.

The delay mechanism 144 may receive a delay output from the safety program 142 corresponding to the delay value. The delay mechanism 144 may receive the delay output when the imminent brake event is about to occur. As a result of receiving the delay output from the safety program 142, the delay mechanism 144 may generate an instruction to the vehicle 110 and/or the brake system 112 that delays a deceleration of the vehicle 110 by a duration corresponding to the delay value (e.g., the brake system 112 is suspended). For example, based on a vehicle type, characteristics of the passengers riding the vehicle 110, data from the sensors 114, etc., the delay value may range from a few milliseconds to several seconds (e.g., 1 to 3 seconds). The delay mechanism 144 may include a timer that is activated upon receiving the output from the safety program 142. Upon the timer expiring, the delay mechanism 144 may generate a further instruction to the vehicle 110 and/or the brake system 112 that allows the deceleration of the vehicle 110 (e.g., the brake system 112 is enabled).

The notification broadcast device 146 may receive a broadcast output from the safety program 142 indicating that the imminent brake event is about to occur. The notification broadcast device 146 may receive the broadcast output when the imminent brake event is determined. As a result of receiving the broadcast output from the safety program 142, the notification broadcast device 146 may generate an instruction that the notification is to be broadcast. In a first exemplary embodiment, the notification server 140 may include a transmitter (not shown) such that the notification broadcast device 146 instructs the transmitter to broadcast the notification to the smart devices 120. In another exemplary embodiment, the vehicle 110 and/or a transmitter of the vehicle 110 may receive the instruction to broadcast the notification. The notification may be broadcast generally to the smart devices 120 or dynamically broadcast based on demographics or other characteristics of the passengers that the smart devices 120 are associated (e.g., passengers who are disabled or elderly and require additional time to prepare for the imminent brake event may be broadcast the notification sooner than passengers who are healthy). The notification broadcast device 146 may continue to instruct that the notification is to be broadcast until the brake system 112 is enabled (e.g., when the timer having a duration corresponding to the delay value has expired).

Figure 2:
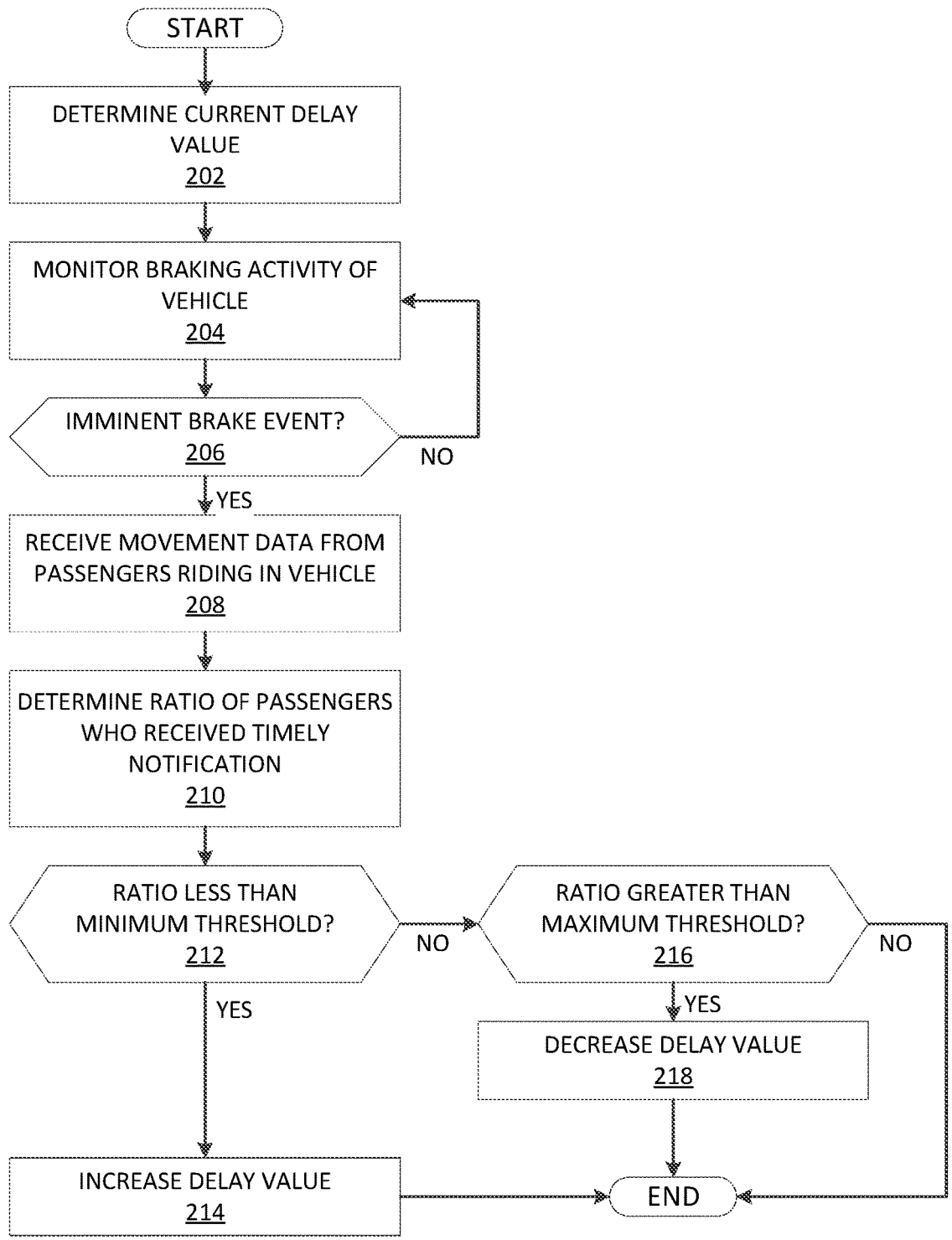
FIG. 2 depicts an exemplary flowchart illustrating the operations of a safety program 142 of the safety notification system 100 in setting a delay value to a brake system 112 of a vehicle 110, in accordance with the exemplary embodiments.

FIG. 2 depicts an exemplary flowchart illustrating the operations of the safety program 142 of the safety notification system 100 in setting a delay value to the brake system 112 of a vehicle 110, in accordance with the exemplary embodiments.

The safety program 142 may determine a current delay value for the vehicle 110 (step 202). The safety program 142 may access the vehicle profile 132 from the profile repository 130 for the vehicle 110. The vehicle profile 132 may store various information regarding the vehicle 110 including a delay value that was previously used. For example, relative to a current driving session, the vehicle 110 may have been driven at a prior driving session and a delay value may have been determined during this prior driving session. In another example, during a current driving session, the vehicle 110 may have determined a delay value (e.g., at a previous imminent brake event). In a further example, the vehicle profile 132 may indicate a default delay value.

To further illustrate the operations of the safety program 142, reference is now made to an illustrative example. According to the illustrative exemplary embodiment, the vehicle 110 may be a bus including a driver and a plurality of passengers. The current delay value may be set based on a previously determined delay value. For example, the delay value may be 1 second. The safety program 142 may identify this delay value based on the information included in the corresponding vehicle profile 132 associated with the vehicle 110. Using subsequent operations to be described below, the safety program 142 may then determine whether any modifications are to be applied to the current delay value that consider the current and/or changing conditions being experienced by the vehicle 110.

The safety program 142 may monitor braking activity of the vehicle 110 (step 204). The safety program 142 may be configured to monitor the braking activity of the vehicle 110 based on the brake system 112 and/or the sensors 114. For example, based on inputs that the driver or conductor of the vehicle 110 provides to the brake system 112, the safety program 142 may determine the various types of brake events that are registered. Thus, when the brake system 112 includes a brake pedal, depression of the brake pedal may indicate a brake event. In another example, based on outputs from the sensors 114, the safety program 142 may determine when brake events are likely to occur. The sensors 114 may provide information of the surroundings of the vehicle 110 and/or current conditions of the vehicle 110. As a result of this information, the safety program 142 may determine that a brake event will occur based on various criteria. For example, when the speedometer shows a decrease in speed, the safety program 142 may determine a brake event. In another example, when the cameras and/or ultrasound sensors determine a stationary object within a certain distance along a drive path and the vehicle 110 is traveling at a certain speed, the safety program 142 may predict that a brake event is likely. In a further example, when the cameras identify a signal (e.g., traffic light) or sign (e.g., stop or yield sign) instructing a stop or brake, the safety program 142 may predict that a brake event is likely. As those skilled in the art will appreciate, there may be a plurality of other manners that the safety program 142 may determine when a brake event is occurring or likely within the scope of the exemplary embodiments using information provided through components described herein or any other available information.

With reference again to the previously introduced example, the safety program 142 may monitor the brake pedal of the bus and monitor the information provided by the various sensors 114 that may be included on and in the bus. For example, whenever the driver of the bus depresses the brake pedal, the safety program 142 may register the brake event. In another example, the bus may include a speedometer tracking a speed of the bus, a scale measuring a weight of the bus, cameras or ultrasound sensors to detect objects around the bus, etc. Based on the information from the sensors 114, the safety program 142 may register a brake event or determine a likely brake event. In a further example, the accelerometers of the smart devices 120 may provide movement related information specific to the respective smart devices 120. With the smart devices 120 being in the vehicle 110, the movement related information of the smart devices 120 may be indicative of the movement of the vehicle 110.

The safety program 142 may determine whether a brake event is an imminent brake event (decision 206). The safety program 142 may identify imminent brake events based on various criteria. For example, using the brake system 112, the safety program 142 may determine a relative urgency with which the brake system 112 is used (e.g., sudden and intense depression of a brake pedal). In another example, using the sensors 114, the safety program 142 may detect a condition that may trigger the imminent brake event (e.g., the vehicle 110 may collide with an object unless a sudden stop or deceleration is used). The safety program 142 may be configured with respective thresholds for each of the different brake events that indicate whether the brake event qualifies as an imminent brake event. For example, when the brake pedal is depressed greater than a certain amount within a certain time duration (e.g., dependent on the type of vehicle and type of brake system), the safety program 142 may qualify the brake event as an imminent brake event. In another example, when the object with which the vehicle 110 may collide is less than a certain distance while the vehicle 110 is traveling more than a certain speed with consideration of other characteristics (e.g., weight of the vehicle 110), the safety program 142 may qualify an upcoming brake event as an imminent brake event.

To minimize false positives of imminent brake events, the safety program 142 may utilize information received from the smart devices 120. As each brake event is registered, the information from the smart devices 120 may provide further insight to verify a brake event that was determined to be an imminent brake event. For example, the information from the brake system 112 and/or the sensors 114 may indicate that a brake event is an imminent brake event. However, the feedback from the smart devices 120 (e.g., from sensors including an accelerometer) may indicate that the passengers did not experience the brake event as an imminent brake event. Through this feedback, the safety program 142 may train the conditions of the vehicle 110 that are indicative of imminent brake events.

Referring now to the previously introduced, illustrative example, the bus may be traveling down a multi-lane road. The driver may be applying pressure on the brake pedal for tracking purposes, to compensate for traffic, etc. However, these types of braking activities may utilize a gradual deceleration that is less than the threshold for using the brake pedal such that the safety program 142 does not qualify these as imminent brake events. At a subsequent time, a further vehicle may enter the lane in front of the bus unexpectedly at a distance less than a distance threshold. Furthermore, the bus may be traveling greater than a speed threshold while experiencing a weight greater than a weight threshold. In such a scenario, the safety program 142 may determine that the next brake event is likely an imminent brake event.

As a result of a brake event being a non-imminent brake event (decision 206, "NO" branch), the safety program 142 may continue monitoring the braking activity and assess each brake event to identify imminent brake events. As a result of the brake event being an imminent brake event (decision 206, "YES" branch), the safety program 142 may receive movement data from the passengers riding in the vehicle 110 (step 208). After the imminent brake event has occurred, the safety program 142 may determine whether passengers were prepared and braced for the sudden stop or deceleration or whether the passengers were unprepared and were not able to make appropriate action. As will be described in detail below, a notification may be broadcast when the imminent brake event is identified to alert the passengers of the upcoming imminent brake event. By postponing use of the brake system 112, the exemplary embodiments may create a window in which the passengers may brace or hold onto a safety device. As a result of preparing, the passengers may remain substantially stationary (e.g., the passengers do not move from a current position relative to the vehicle 110) or experience a lesser force (e.g., the passengers moving less creates a lesser deceleration that coincides with the deceleration of the vehicle 110 whereas the passengers moving more creates a greater deceleration higher than the deceleration of the vehicle 110). For example, using accelerometers or other components that measure movement of the smart devices 120, the safety program 142 may determine whether the passenger experienced the imminent brake event in a prepared or unprepared manner. In a particular exemplary embodiment, the safety program 142 may use a distance or force threshold experienced by the smart devices 120. Thus, when the smart devices 120 moved a distance greater than the distance threshold or experienced a force greater than the force threshold, the safety program 142 may determine that a notification that was broadcast did not create a sufficient window for the passengers to react to the imminent brake event. In contrast, when the smart devices 120 moved a distance less than the distance threshold or experienced a force less than the force threshold, the safety program 142 may determine that a notification that was broadcast created a sufficient window for the passengers to react to the imminent brake event.

In one exemplary embodiment, the preparedness of the passengers may be determined using a general standard that is applied to each of the passengers. In another exemplary embodiment, the preparedness of the passengers may be respective to each passenger based on the characteristics of the passengers. For example, a healthy passenger may require less time to prepare for the imminent brake event than a disabled or elderly passenger. The safety program 142 may be configured to determine the individual preparedness of the passengers based on the demographics or other information (e.g., passenger profile) of the passengers. As will be described in detail below, the notifications may be broadcast based on the demographics of the passengers and the delay value applied to the brake system 112 may be set based on the demographics of the passengers.

With reference again to the illustrative example, there may be a plurality of passengers riding the bus. The smart devices 120 may each include the warning client 122 and be associated with the notification server 140. Outputs of accelerometers included in the smart devices 120 may be provided to the safety program 142. Using the distance or force measurements based on the information from the accelerometers, the safety program 142 may receive the movement data from the passengers based on movement of the respective smart devices 120.

The safety program 142 may determine a ratio of passengers who received and did not receive the notification in a timely manner (step 210). When the movement data of the passengers indicate that a first group of the passengers experienced the imminent brake event beyond a corresponding threshold, the safety program 142 may define these first passengers as not having received the notification in a timely manner. When the movement data of the passengers indicate that a second group of the passengers experienced the imminent brake event within a corresponding threshold, the safety program 142 may define these second passengers as receiving the notification in a timely manner.

Returning to the previously introduced example, there may be 10 passengers riding the vehicle. In a first scenario, 8 passengers may have received the notification in a timely manner. Thus, the movement data may indicate that 8 passengers experienced a force from the imminent brake event that is less than the force threshold. Accordingly, the movement data may also indicate that 2 passengers experienced a force from the imminent brake event that is greater than the force threshold. In a second scenario, 3 passengers may have received the notification in a timely manner while 7 passengers did not receive the notification in a timely manner. In a second scenario, 5 passengers may have received the notification in a timely manner while 5 passengers did not receive the notification in a timely manner.

The safety program 142 may determine whether the ratio is less than a minimum threshold (decision 212). In determining the preparedness of the passengers and based on the ratio of passengers having a timely reception of the notification, the safety program 142 may determine whether the delay value used to postpone use of the brake system 112 is at a proper value, at a value greater than required, or at a value less than required. Thus, when the ratio is less than the minimum threshold (decision 212, "YES" branch), the safety program 142 may determine that the delay value is set at a value less than required and should be increased for the ratio to at least meet the minimum threshold (e.g., create a greater window for the passengers to react to subsequent imminent brake events). Accordingly, the safety program 142 may increase the delay value (step 214). The increase to the delay value may be dynamically determined based on the ratio, based on the conditions of the vehicle, etc. The increase to the delay value may also be determined according to a predetermined increment.

When the ratio is more than the minimum threshold (decision 212, "NO" branch), the safety program 142 may determine whether the ratio is greater than a maximum threshold (decision 216). When the ratio is greater than the maximum threshold, the safety program 142 may determine that the delay value is set at a value greater than required and should be decreased to minimize a duration that the brake system 112 is postponed from being used. If the safety program 142 utilizes a strict standard, the maximum threshold may be set such that each of the passengers riding in the vehicle 110 are to receive the notification with a sufficient window to react in time for the imminent brake event.

If the ratio is less than the maximum threshold (decision 216, "NO" branch), the safety program 142 may maintain the current delay value. With the ratio being between the minimum threshold and the maximum threshold, the delay value may be set at a proper value for the current conditions of the vehicle 110. If the ratio is greater than the maximum threshold (decision 216, "YES" branch), the safety program 142 may decrease the delay value (step 218). The decrease to the delay value may be dynamically determined based on the ratio, based on the conditions of the vehicle, etc. The decrease to the delay value may also be determined according to a predetermined increment. The safety program 142 may also decrease the delay value so that the delay value is not less than a zero delay value.

Continuing with the illustrative example, the minimum threshold may be set to 20% and the maximum threshold may be set to 70%. However, the minimum threshold and the maximum threshold may be dynamic values set based on a variety of factors. For example, an administrator of the notification server 140 may set the minimum threshold and the maximum threshold based on feedback from passengers over time to properly adjust these values. By incorporating the feedback along with other factors such as geography (e.g., a driving culture may vary from city to city, country to country, etc.), time of the day (e.g., passengers or drivers may be more stressed at the end of a working day leading to a driving style that may be different in the late afternoon/evening), day of the week, etc., the minimum threshold and the maximum threshold may be dynamically adjusted to correspond to the vehicle 110 and/or other standards.

In the first scenario of the illustrative example involving 8 passengers timely receiving the notification to make appropriate preparations and 2 passengers not receiving the notification in a timely manner to make appropriate preparations, the safety program 142 may determine that the ratio is greater than the minimum threshold and greater than the maximum threshold. Thus, the safety program 142 may decrease the delay value. In the second scenario of the illustrative example involving 3 passengers timely receiving the notification to make appropriate preparations and 7 passengers not receiving the notification in a timely manner to make appropriate preparations, the safety program 142 may determine that the ratio is less than the minimum threshold and less than the maximum threshold. Thus, the safety program 142 may increase the delay value. In the third scenario of the illustrative example involving 5 passengers timely receiving the notification to make appropriate preparations and 5 passengers not receiving the notification in a timely manner to make appropriate preparations, the safety program 142 may determine that the ratio is greater than the minimum threshold and less than the maximum threshold. Thus, the safety program 142 may maintain the current delay value.

Although the exemplary flowchart of FIG. 2 is shown to conclude, those skilled in the art will understand that the flowchart may be an iterative process during a time that the vehicle 110 is in use. Accordingly, after each imminent brake event, the safety program 142 may process the delay value. Subsequently, the safety program 142 may return to monitoring the braking activity of the vehicle 110 (step 204) and perform the subsequent operations for an ensuing imminent brake event.

Figure 3:
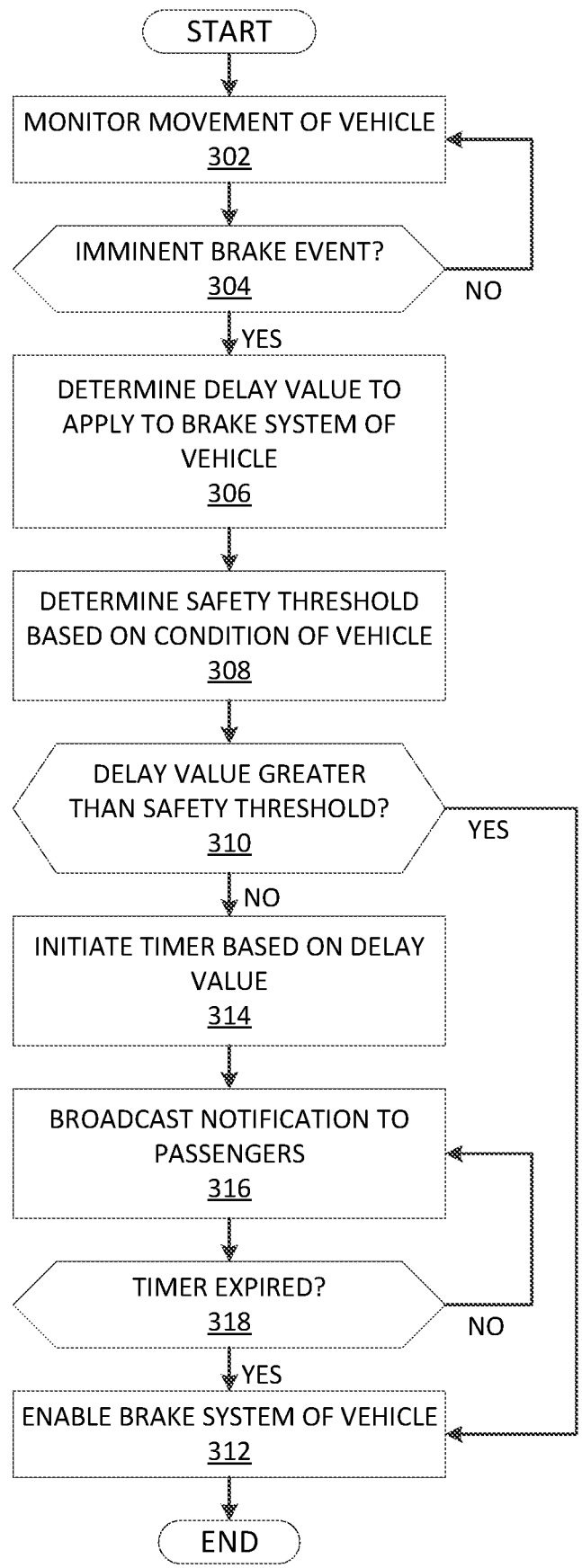
FIG. 3 depicts an exemplary flowchart illustrating the operations of a safety program 142 of the safety notification system 100 in broadcasting a notification of an imminent brake event, in accordance with the exemplary embodiments.

FIG. 3 depicts an exemplary flowchart illustrating the operations of the safety program 142 of the safety notification system 100 in broadcasting a notification of an imminent brake event, in accordance with the exemplary embodiments. The exemplary flowchart of FIG. 3 also illustrates the operations of the delay mechanism 144 and the notification broadcast device 146 as a result of operations of the safety program 142.

The safety program 142 may monitor movement of the vehicle 110 (step 302). With respect to the various types of movements that the vehicle 110 is capable of performing, the safety program 142 may monitor the braking activity of the vehicle 110. As described above, the safety program 142 may be configured to monitor the braking activity of the vehicle 110 using a variety of different approaches based on information provided by the brake system 112 and/or the sensors. Again, as those skilled in the art will appreciate, there may be a plurality of other manners that the safety program 142 may determine when a brake event is occurring or likely within the scope of the exemplary embodiments using information provided through components described herein or any other available information.

The safety program 142 may determine whether a brake event is an imminent brake event (decision 304). As described above, the safety program 142 may identify imminent brake events based on various criteria including a relative urgency with which the brake system 112 is used, detecting a condition that may trigger the imminent brake event, various thresholds and combinations thereof relating to the conditions and surroundings of the vehicle 110, etc.

To further illustrate the operations of the safety program 142 in generating a notification, reference is again made to the above illustrative example described with regard to determining the delay value. The above described operations with which the safety program 142 may monitor movement of the bus and determine imminent brake events may be substantially similar and used in generating the notification. For example, the safety program 142 may monitor the brake pedal of the bus, monitor the information provided by the various sensors 114, etc. The safety program 142 may also utilize the information from the smart devices 120 to minimize false positives of imminent brake events.

As noted above in the illustrative example, the bus may be in a scenario where a further vehicle enters the lane in front of the bus unexpectedly at a distance less than a distance threshold. Furthermore, the bus may be traveling greater than a speed threshold while experiencing a weight greater than a weight threshold. In such a scenario, the safety program 142 may determine that the next brake event is likely an imminent brake event.

As a result of a brake event being a non-imminent brake event (decision 304, "NO" branch), the safety program 142 may continue monitoring the movement and the braking activity and assess each brake event to identify imminent brake events. As a result of the brake event being an imminent brake event (decision 304, "YES" branch), the safety program 142 may determine a delay value to apply to the brake system 112 of the vehicle 110 (step 306). As described above, the safety program 142 may access the vehicle profile 132 from the profile repository 130 for the vehicle 110 to determine the current delay value that is set for the vehicle 110 (e.g., based on a previously used delay value, an ad hoc determined delay value, a default delay value, etc.).

Referring now to the previously introduced, illustrative example, the vehicle profile 132 for the bus may indicate that the current delay value to be used during an imminent brake event is set to 1 second. The current delay value may have been determined based on a previous imminent brake event through a modification based on the ratio of passengers riding the bus who timely received a previous notification broadcast during the previous imminent brake event and those passengers who did not timely receive the previous notification. Other delay values in the illustrative example may range from 0.5 seconds to 1.5 seconds.

The safety program 142 may determine a safety threshold based on a current condition of the vehicle 110 (step 308). The safety threshold may represent a maximum delay that may be applied to the brake system 112 without resulting in a hazardous condition from preventing the vehicle 110 to timely decelerate in response to the imminent brake event. As each imminent brake event may have differing conditions for the vehicle 110 (e.g., total weight of the vehicle 110) and the surrounding conditions of the vehicle 110 (e.g., distance to various objects, lanes of road, etc.) as well as to the reason for the imminent brake event (e.g., upcoming turn, stationary object in driving path, etc.), the safety threshold may be dynamically determined for each imminent brake event that is experienced by the vehicle 110. For example, the safety threshold may also incorporate information from proximity sensors, a velocity of the vehicle 110, a weight of the vehicle 110, a weight of the passengers, demographics of the passengers, etc. In an exemplary operation to determine the safety threshold, using the information from the sensors 114, the safety program 142 may determine a maximum amount of time required for the vehicle 110 to safely respond to the conditions of the imminent brake event. The safety program 142 may also determine an amount of brake time that the brake system 112 may require to decelerate the vehicle 110 in a timely manner (e.g., based on a condition of the brakes of the brake system 112). The safety program 142 may set the safety threshold to the difference between the maximum amount of time and the brake time. When the brake time exceeds the maximum amount of time, the safety program 142 may set the safety threshold to zero.

With reference again to the illustrative example, the bus may be in various scenarios that have corresponding safety thresholds. In a first scenario, the bus may be traveling toward a traffic light that is currently green. As the bus approaches the traffic light, the light may change (e.g., to yellow). Given the speed of the bus and the distance to the traffic light, the bus may experience an imminent brake event. The bus may be relatively light (e.g., the number of passengers is less than half capacity) and the brake system 112 may be in good condition. Accordingly, the bus may require 3 seconds to respond to the traffic light while the brake system 112 may require 1 second to decelerate in time. Thus, the safety threshold may be set to 2 seconds. In a second scenario, the bus may be traveling down a road when a sudden object enters the path of the bus. The object may have a certain distance to the bus while the bus is traveling at a certain speed with a certain weight. Accordingly, the bus may require 1.5 seconds to respond to the object while the brake system 112 may require 1 second to decelerate in time. Thus, the safety threshold may be set to 0.5 seconds.

The safety program 142 may determine whether the current delay value is greater than the safety threshold (decision 310). In comparing the delay value to the safety threshold, the safety program 142 may determine whether the delay value may be used for the imminent brake event. For example, if the delay value is less than the safety threshold, the safety program 142 may apply the delay value without compromising the safety of the passengers. However, if the delay value is greater than the safety threshold, the safety program 142 may omit using the delay value so that the brake system 112 may be used immediately.

If the delay value is greater than the safety threshold (decision 310, "YES" branch), the safety program 142 may immediately enable use of the brake system 112 without applying the delay value (step 312). Thus, the safety program 142 may provide a maximum amount of time for the vehicle 110 to react to the imminent brake event.

If the delay value is less than the safety threshold (decision 310, "NO" branch), the safety program 142 may perform subsequent operations involving using the delay value. In a first operation, the safety program 142 may initiate a timer based on the delay value (step 314). The timer may be set to a duration corresponding to the delay value. The delay mechanism 144 may postpone any brake activity for this duration that the timer is running. For example, the driver or conductor of the vehicle 110 may actuate the brake system 112 of the vehicle 110. However, if this actuation is performed while the timer is running, the delay mechanism 144 may postpone use of the brake system 112.

In a second operation, the safety program 142 may broadcast a notification to the passengers (step 316). The notification broadcast device 146 may broadcast the notification to the warning client 122 on each of the smart devices 120. The warning client 122 may activate a sensory component of the smart device 120 such that the passenger associated with the smart device 120 may uniquely be alerted of the imminent brake event. For example, the smart device 120 may play out a sound, vibrate the device, illuminate the device using a lighting pattern, etc. With the alert, the passengers may brace or hold onto a safety device of the vehicle 110 to prepare for the imminent brake event.

In a third operation, the safety program 142 may determine whether the timer having a duration corresponding to the delay value has expired (decision 318). If the timer is still running (decision 318, "NO" branch), the safety program 142 may continue to broadcast the notification to the passengers. If the timer has expired (decision 318, "YES" branch), the safety program 142 may enable the brake system 112 of the vehicle 110 (step 312).

Returning to the previously introduced example, the delay value may be set to 1 second. In the first scenario, the safety threshold may be determined to be 2 seconds. Accordingly, the safety program 142 may determine that the delay value is less than the safety threshold and may postpone use of the brake system 112. Thus, the bus may initiate the timer for 1 second which postpones use of the brake system 112 and broadcast a notification to the passengers via the warning client 122 on the respective smart devices 120. During this time, the passengers may prepare for the imminent brake event. When the timer has expired, the safety program 142 may enable the brake system 112. In the second scenario, the safety threshold may be determined to be 1.5 seconds. Accordingly, the safety program 142 may determine that the delay value is greater than the safety threshold and may enable immediate use of the brake system 112. Thus, the bus may receive any actuation of the brake system 112 without any delay to decelerate the bus.

Although the exemplary flowchart of FIG. 3 is shown to conclude, those skilled in the art will understand that the flowchart may be an iterative process during a time that the vehicle 110 is in use. Accordingly, after each imminent brake event, the safety program 142 may continue to monitor the movement of the vehicle and determine when the delay value may be applied to the brake system 112 for a subsequent imminent brake event.

The exemplary embodiments are configured to notify passengers riding a vehicle of an imminent brake event involving a sudden stop or a drastic reduction in speed. The exemplary embodiments may postpone use of a brake system of the vehicle to create a window in which the exemplary embodiments broadcast a notification to smart devices associated with the passengers to allow the passengers to brace or prepare. The exemplary embodiments alert the passengers in the loop of active heavy braking and delays active braking by an amount less than a maximum delay possible to safely stop the vehicle and not cause too much force on the passengers. The exemplary embodiments may also determine a delay value that is to be used as the basis for postposing use of the brake system of the vehicle based on previous uses of the delay value and a ratio of passengers who timely received the notification to passengers who did not timely receive the notification.

Figure 4:
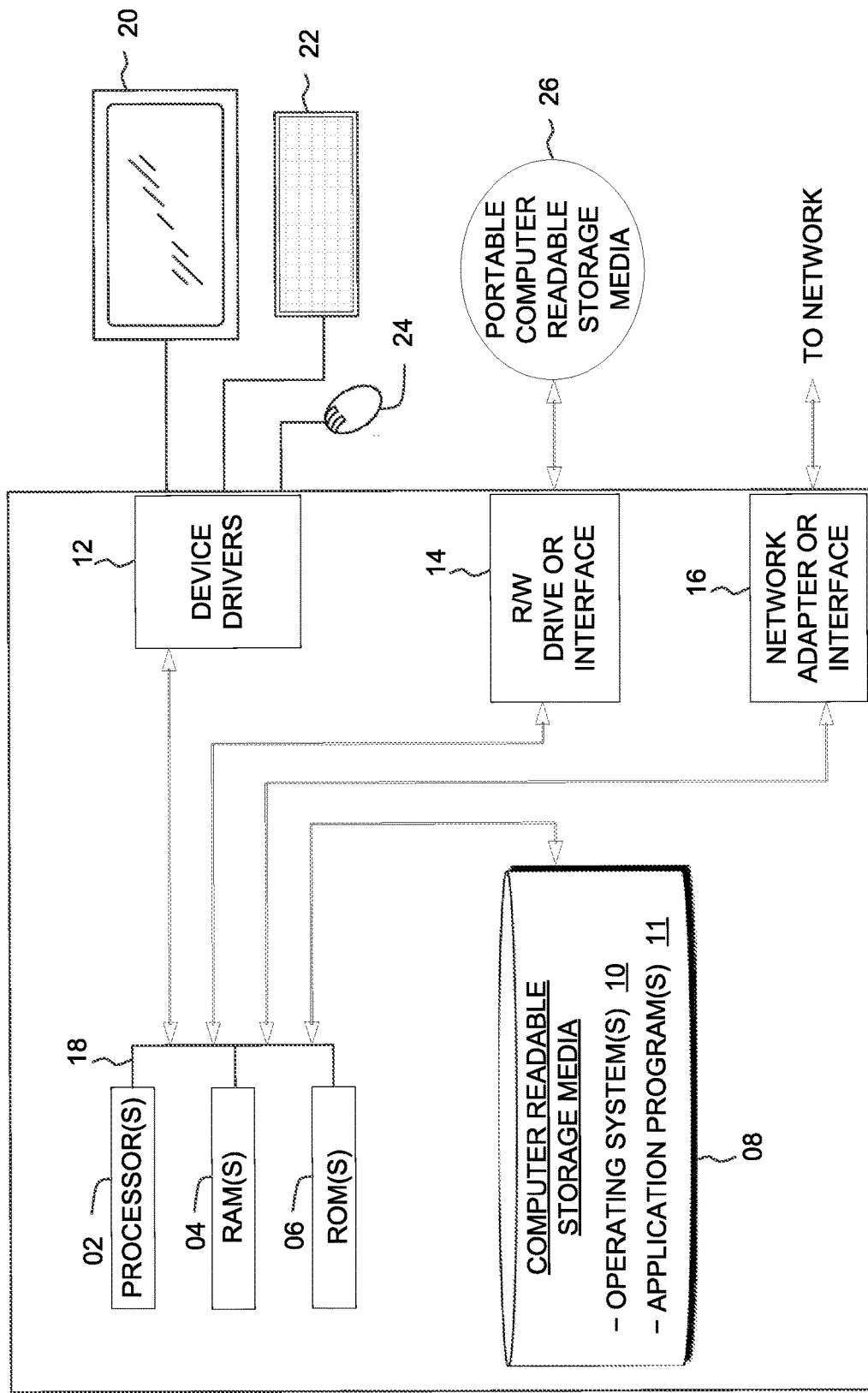
FIG. 4 depicts an exemplary block diagram depicting the hardware components of the safety notification system 100 of FIG. 1, in accordance with the exemplary embodiments.

FIG. 4 depicts a block diagram of devices within the safety notification system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
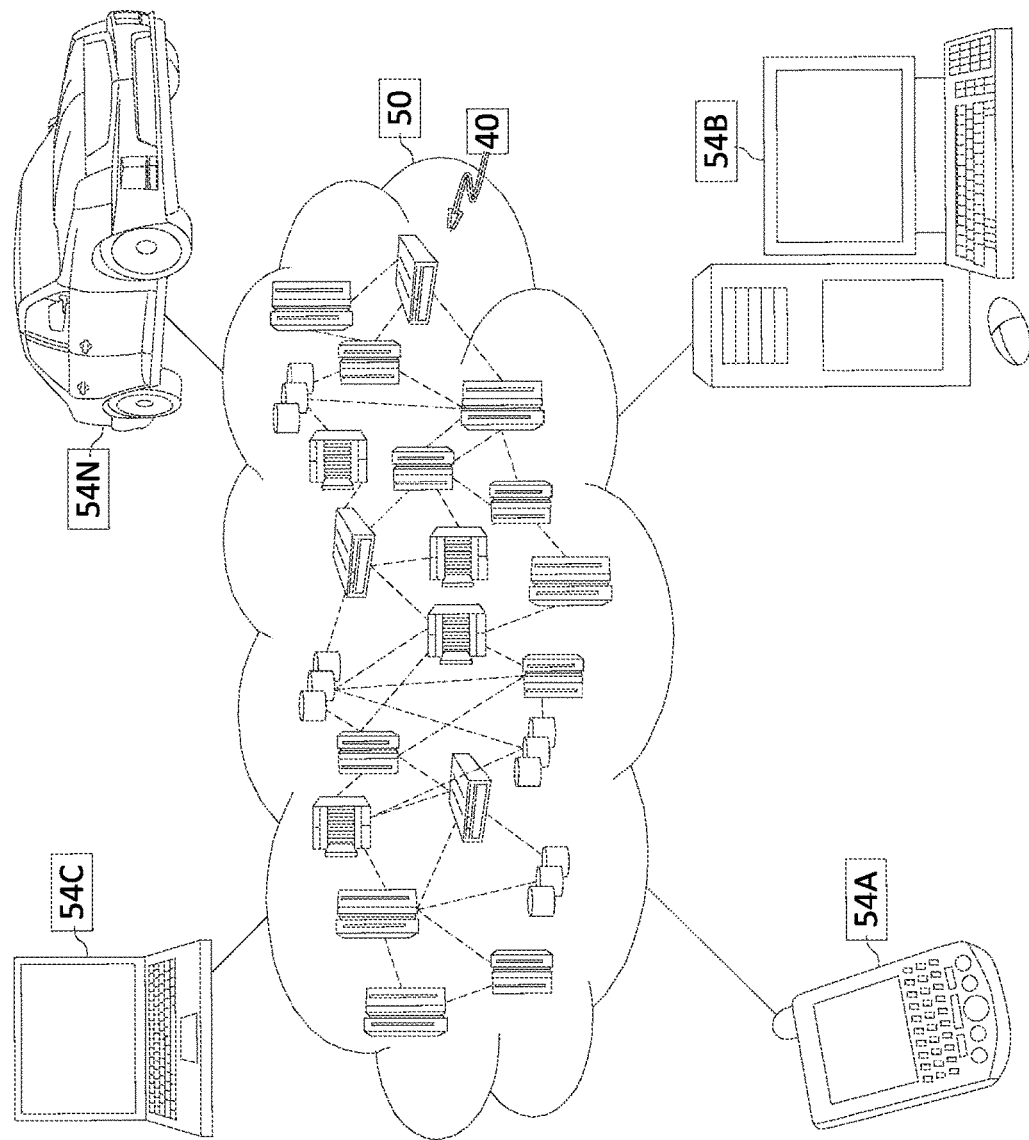
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and notification processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for notifying passengers of an imminent brake event of a vehicle to prevent a hazardous condition, the method comprising:
   determining that the imminent brake event is about to occur;
   determining a delay value to be applied to a brake system of the vehicle;
   determining a safety threshold associated with the imminent brake event based on at least one of conditions of the vehicle and surroundings of the vehicle, the conditions of the vehicle comprising a speed and a weight of the vehicle, the safety threshold being indicative of a maximum delay value that may be applied to the brake system of the vehicle to prevent the hazardous condition;
   as a result of the delay value being less than the safety threshold, postponing use of the brake system for a duration corresponding to the delay value; and
   broadcasting a notification to the passengers of the imminent brake event.

2. The computer-implemented method of claim 1, wherein the conditions of the vehicle and the surroundings of the vehicle are based on at least one vehicle sensor included in the vehicle.

3. The computer-implemented method of claim 1, wherein the notification is broadcast to respective smart devices associated with the passengers.

4. The computer-implemented method of claim 3, wherein the notification triggers a sensory feedback on the smart devices uniquely indicating the imminent brake event.

5. The computer-implemented method of claim 1, further comprising:
    after the imminent brake event, receiving movement data associated with the passengers;
    determining first ones of the passengers who prepared for the imminent brake event based on a timely reception of the notification and second ones of the passengers who were unprepared for the imminent brake event.

6. The computer-implemented method of claim 5, further comprising:
    as a result of a ratio of the first passengers to the second passengers being less than a minimum threshold, increasing the delay value; and
    as a result of the ratio of the first passengers to the second passengers being greater than a maximum threshold, decreasing the delay value.

7. The computer-implemented method of claim 1, wherein the delay value is based at least partially on passenger profiles respectively corresponding to the passengers indicating characteristics of the passengers.

8. A computer program product for notifying passengers of an imminent brake event of a vehicle to prevent a hazardous condition, the computer program product comprising:
    one or more non-transitory computer-readable storage media and program instructions stored on the one or more non-transitory computer-readable storage media capable of performing a method, the method comprising:
        determining that the imminent brake event is about to occur;
        determining a delay value to be applied to a brake system of the vehicle;
        determining a safety threshold associated with the imminent brake event based on at least one of conditions of the vehicle and surroundings of the vehicle, the conditions of the vehicle comprising a speed and a weight of the vehicle, the safety threshold being indicative of a maximum delay value that may be applied to the brake system of the vehicle to prevent the hazardous condition;
        as a result of the delay value being less than the safety threshold, postponing use of the brake system for a duration corresponding to the delay value; and
        broadcasting a notification to the passengers of the imminent brake event.

9. The computer program product of claim 8, wherein the conditions of the vehicle and the surroundings of the vehicle are based on at least one vehicle sensor included in the vehicle.

10. The computer program product of claim 8, wherein the notification is broadcast to respective smart devices associated with the passengers.

11. The computer program product of claim 10, wherein the notification triggers a sensory feedback on the smart devices uniquely indicating the imminent brake event.

12. The computer program product of claim 8, wherein the method further comprises:
    after the imminent brake event, receiving movement data associated with the passengers;
    determining first ones of the passengers who prepared for the imminent brake event based on a timely reception of the notification and second ones of the passengers who were unprepared for the imminent brake event.

13. The computer program product of claim 12, wherein the method further comprises:
    as a result of a ratio of the first passengers to the second passengers being less than a minimum threshold, increasing the delay value; and
    as a result of the ratio of the first passengers to the second passengers being greater than a maximum threshold, decreasing the delay value.

14. The computer program product of claim 8, wherein the delay value is based at least partially on passenger profiles respectively corresponding to the passengers indicating characteristics of the passengers.

15. A computer system for notifying passengers of an imminent brake event of a vehicle to prevent a hazardous condition, the computer system comprising:
    one or more computer processors, one or more computer-readable storage media, and program instructions stored on the one or more of the computer-readable storage media for execution by at least one of the one or more processors capable of performing a method, the method comprising:
        determining that the imminent brake event is about to occur;
        determining a delay value to be applied to a brake system of the vehicle;
        determining a safety threshold associated with the imminent brake event based on at least one of conditions of the vehicle and surroundings of the vehicle, the conditions of the vehicle comprising a speed and a weight of the vehicle, the safety threshold being indicative of a maximum delay value that may be applied to the brake system of the vehicle to prevent the hazardous condition;
        as a result of the delay value being less than the safety threshold, postponing use of the brake system for a duration corresponding to the delay value; and
        broadcasting a notification to the passengers of the imminent brake event.

16. The computer system of claim 15, wherein the conditions of the vehicle and the surroundings of the vehicle are based on at least one vehicle sensor included in the vehicle.

17. The computer system of claim 15, wherein the notification is broadcast to respective smart devices associated with the passengers.

18. The computer system of claim 15, wherein the method further comprises:
    after the imminent brake event, receiving movement data associated with the passengers;
    determining first ones of the passengers who prepared for the imminent brake event based on a timely reception of the notification and second ones of the passengers who were unprepared for the imminent brake event.

19. The computer system of claim 18, wherein the method further comprises:
    as a result of a ratio of the first passengers to the second passengers being less than a minimum threshold, increasing the delay value; and as a result of the ratio of the first passengers to the second passengers being greater than a maximum threshold, decreasing the delay value.

20. The computer system of claim 18, wherein the movement data is based on a sensor included in a smart device associated with respective ones of the passengers.

* * * * *